United States Patent [19]

Soga et al.

[11] Patent Number: 5,216,102
[45] Date of Patent: Jun. 1, 1993

[54] PROCESS FOR PRODUCING POLYACETYLENE

[75] Inventors: Mamoru Soga, Osaka; Shu Hotta, Kawasaki; Nobuo Sonoda, Settu; Hideki Shirakawa; Kazuo Akagi, both of Tukuba, all of Japan

[73] Assignee: Matsushita Electric Industrial Co., Ltd., Osaka, Japan

[21] Appl. No.: 767,580

[22] Filed: Sep. 30, 1991

Related U.S. Application Data

[63] Continuation of Ser. No. 455,396, Feb. 16, 1990.

[30] Foreign Application Priority Data

Aug. 5, 1988 [JP] Japan .................................. 63-196553
Oct. 7, 1988 [JP] Japan .................................. 63-254085
Aug. 2, 1989 [WO] PCT Int'l Appl. ... PCT/JP89/00794

[51] Int. Cl.$^5$ .......................... C08F 38/02; C08F 2/02
[52] U.S. Cl. ........................................ 526/285; 526/61; 526/90; 526/95; 526/159; 526/162; 526/185; 526/188; 526/189; 526/901
[58] Field of Search .................. 526/285, 185, 188, 61, 526/901

[56] References Cited

U.S. PATENT DOCUMENTS

| | | | |
|---|---|---|---|
| 4,277,588 | 7/1981 | Naarmann | 526/114 |
| 4,410,640 | 10/1983 | Kobayashi | 521/63 |
| 4,452,959 | 6/1984 | Kobayashi et al. | 526/159 |
| 4,579,921 | 4/1986 | Gouarderes | 526/159 |
| 4,596,852 | 6/1986 | Kobayashi et al. | 524/550 |
| 4,745,163 | 5/1988 | Hide | 526/62 |
| 4,983,696 | 1/1991 | Soga | 526/159 |
| 5,008,040 | 4/1991 | Tsukamoto | 252/500 |

OTHER PUBLICATIONS

International Search Report.

Primary Examiner—Joseph L. Schofer
Assistant Examiner—Fred Zitomer
Attorney, Agent, or Firm—Stevens, Davis, Miller & Mosher

[57] ABSTRACT

The present invention provides a process for producing a polyacetylene.

In the present process for producing a polyacetylene, acetylene is polymerized with a Ziegler-Natta catalyst consisting of a trialkylaluminum and an alkyl titanate, wherein there is used, as the trialkylaluminum, a trialkylaluminum having an alkyl group of 6 or more carbon atoms, or, as the alkyl titanate, an alkyl titanate having an alkyl group of 6 or more carbon atoms.

The polyacetylene obtained according to the present invention is superior in mechanical properties, particularly stretchability.

1 Claim, No Drawings

PROCESS FOR PRODUCING POLYACETYLENE

This application is a continuation of application Ser. No. 07/455,396, filed Feb. 16, 1990.

TECHNICAL FIELD

The present invention relates to a process for producing a polyacetylene superior in mechanical properties, particularly stretchability.

BACKGROUND ART

It is well known generally that a polyacetylene can be obtained by, for example, polymerizing acetylene with a Ziegler-Natta catalyst consisting of triethylaluminum and tetrabutyl titanate, as described in, for example, J. Polym. Sci., Polym. Chem. Ed., 12, 11, 1974.

The polyacetylene obtained with the Ziegler-Natta catalyst consisting of triethylaluminum and tetrabutyl titanate, however, has a limit in stretchability and has hitherto shown a stretchability of only about 3-5 times.

In reacting acetylene gas with the above Ziegler-Natta catalyst, the heat treatment of the Ziegler-Natta catalyst at 80° C.–150° C. in an inert gas prior to said reaction gives a slight increase in stretchability of the polyacetylene obtained, but the resulting stretchability is not sufficient.

In view of the above point, the object of the present invention is to provide a polyacetylene with excellent stretchability.

DISCLOSURE OF THE INVENTION

The present invention provides a process for producing a polyacetylene by polymerizing acetylene with a Ziegler-Natta catalyst consisting of a trialkylaluminum and an alkyl titanate, the process being characterized by using, as the trialkylaluminum, a trialkylaluminum having an alkyl group of 6 or more carbon atoms, or, as the alkyl titanate, an alkyl titanate having an alkyl group of 6 or more carbon atoms.

BEST MODE FOR CARRYING OUT THE INVENTION

The Ziegler-Natta catalyst used in the present invention for acetylene polymerization consists of a trialkylaluminum at least one of an alkyl titanate, and the trialkylaluminum or the alkyl titanate having an alkyl group of 6 or more carbon atoms.

Examples of the trialkylaluminum having an alkyl group of 6 or more carbon atoms used in the present invention are tri-n-hexylaluminum, tri-n-octylaluminum, tri-n-decylaluminum, tri-n-dodecylaluminum, tri-n-tetradecylaluminum, tri-n-hexadecylaluminum and tri-n-octadecylaluminum.

Examples of the alkyl titanate having an alkyl group of 6 or more carbon atoms used in the present invention are tetra-n-hexyl titanate, tetra-n-octyl titanate, tetra-n-decyl titanate, tetra-n-dodecyl titanate, tetra-n-tetradecyl titanate, tetra-n-hexadecyl titanate and tetra-n-octadecyl titanate.

In the present invention, when the Ziegler-Natta catalyst is heat-treated prior to the polymerization reaction, the temperature of the heat treatment is preferably 50° C. or more. A higher temperature tends to give a polyacetylene of higher stretchability. The upper limit of the heat treatment temperature is the decomposition temperature of the trialkylaluminum used.

Also in the present invention, when the Ziegler-Natta catalyst is heat-treated prior to the polymerization reaction, the time of the heat treatment is preferably 0.5 hour or more.

As the solvent for the Ziegler-Natta catalyst, there can generally be used hydrocarbon type solvents, aromatic type solvents and ether type solvents which are unreactive with the catalyst.

Next, the present invention is explained by way of Examples.

EXAMPLE 1

In an argon atmosphere, 1.8 ml of cumene, 4.5 ml (0.01 mol) of tri-n-octylaluminum and 1.7 ml (0.005 mol) of tetra-n-butyl titanate were mixed to prepare a catalyst solution. (In the following Examples and the Comparative Example, the amounts of trialkylaluminum and tetraalkyl titanate used were 0.01 mol and 0.005 mol, respectively.) The catalyst solution was heated for 2 hours at 120° C. and then 4 ml of the catalyst solution was placed in a polymerization vessel. While the argon and cumene in the vessel were removed by a vacuum pump, the polymerization vessel was rotated to coat the glass inner wall of the vessel with the catalyst solution. After the pressure inside the polymerization vessel had dropped to below $10^{-2}$ Torr, the whole polymerization vessel was cooled to $-78°$ C. with a dry ice-ethanol mixed cooling medium. Acetylene gas was introduced into the polymerization vessel while maintaining the temperature of the vessel. At that time, the gas volume controlled so that the gas pressure inside the polymerization tion vessel became about 600 Torr. Simultaneously with the introduction of acetylene gas, acetylene polymerization took place on the surface of the catalyst solution as well as on the inner wall of the vessel, and formation of a polyacetylene film was observed. The reaction was continued for 4 hours under the same conditions. Excessive acetylene gas was removed, and the inside of the polymerization vessel was returned to the argon atmosphere. In this atmosphere, the resultant polyacetylene film was washed with toluene. Washing was repeated until no catalyst color (blackish brown) was seen in the solvent used. Then, the polyacetylene film was dried under vacuum. The resulting polyacetylene film was cut into $10 \times 30$ mm pieces and stretched at room temperature in an argon atmosphere using a manual stretching machine.

EXAMPLE 2

Acetylene was polymerized in the same manner as in Example 1 except that the trialkylaluminum was 5.5 ml of tri-n-decylaluminum and the amount of cumene was 0.8 ml.

EXAMPLE 3

Acetylene was polymerized in the same manner as in Example 1 except that the trialkylaluminum 1.4 ml of triethylaluminum, the tetraalkyl titanate was 3.0 ml of tetra-n-octyl titanate, and the amount of cumene was 3.6 ml.

EXAMPLE 4

Acetylene was polymerized in the same manner as in Example 1 except that the trialkylaluminum 1.4 ml of triethylaluminum, the tetraalkyl titanate was 2.4 ml of tetra-n-hexyl titanate, and the amount of cumene was 4.2 ml.

EXAMPLE 5

Acetylene was polymerized in the same manner as in Example 1 except that the heat treatment of the catalyst was carried out at 150° C. for 2 hours.

EXAMPLE 6

Acetylene was polymerized in the same manner as in Example 1 except that the cumene was replaced by n-amylbenzene and the heat treatment of the catalyst was carried out at 200° C. for 2 hours.

EXAMPLE 7

Acetylene was polymerized in the same manner as in Example 1 except that the heat treatment of the catalyst was carried out at 120° C. for 4 hours.

EXAMPLE 8

Acetylene was polymerized in the same manner as in Example 1 except that the heat treatment of the catalyst was carried out at 120° C. for 10 hours.

COMPARATIVE EXAMPLE 1

Acetylene was polymerized in the same manner as in Example 1 except that the trialkylaluminum was 1.4 ml of triethylaluminum and the amount of cumene was 4.9 ml.

In the following Table the results of measurement of stretchabilities of the polyacetylenes obtained in Examples 1-13 and the Comparative Example are shown.

TABLE

| | Catalyst | | Heat treatment | | Stretch-ability |
|---|---|---|---|---|---|
| | Trialkylaluminum | Alkyl titanate | Temp. (°C.) | Time (hr) | (times) |
| Example 1 | Tri-n-octylaluminum | Tetra-n-butyl titanate | 120 | 2 | 8 |
| Example 2 | Tri-n-decylaluminum | Tetra-n-butyl titanate | 120 | 2 | 8 |
| Example 3 | Tri-n-ethylaluminum | Tetra-n-octyl titanate | 120 | 2 | 10 |
| Example 4 | Tri-n-ethylaluminum | tetra-n-hexyl titanate | 120 | 2 | 10 |
| Example 5 | Tri-n-octylaluminum | Tetra-n-butyl titanate | 150 | 2 | 15 |
| Example 6 | Tri-n-octylaluminum | Tetra-n-butyl titanate | 200 | 2 | 15 |
| Example 7 | Tri-n-octylaluminum | Tetra-n-butyl titanate | 120 | 4 | 9 |
| Example 8 | Tri-n-octylaluminum | Tetra-n-butyl titanate | 120 | 10 | 10 |
| Comparative Example 1 | Tri-n-ethylaluminum | Tetra-n-butyl titanate | 120 | 2 | 4 |

As is clear from the Table, the polyacetylene obtained by polymerizing acetylene with the Ziegler-Natta catalyst triethylaluminum-tetra-n-butyl titanate as in the Comparative Example showed a stretchability of 4 times. However the polyacetylenes obtained by polymerizing acetylene with the Ziegler-Natta catalysts of the present invention showed stretchabilities of at least 6 times. In the present invention, the stretchability (times) refers to such a maximum stretchability (times) such that when the film is stretched beyond it, breakage occurs.

The polyacetylenes of the present invention were stretched and then cut in $2 \times 20$ mm pieces. Each piece was measured for conductivity in the stretch direction by the four-probe method, while doping the piece with iodine in the gas phase. The conductivities were $10^3$–$10^4$ S/cm, the polyacetylene obtained in Example 1 showing the highest value: 24,000 S/cm.

APPLICABILITY IN INDUSTRY

According to the present invention, a polyacetylene with excellent stretchability can be obtained by employing a process which comprises polymerizing acetylene with a Ziegler-Natta catalyst consisting of a trialkylaluminum and an alkyl titanate, wherein at least one of the trialkylaluminum, or, the alkyl titanate has an alkyl group of 6 or more carbon atoms.

We claim:

1. A process for producing a polyacetylene film having a stretching ratio equal to or more than eight by polymerizing acetylene with a Ziegler-Natta catalyst consisting of a trialkylaluminum and a tetraalkyl titanate, wherein the trialkylaluminum has 8-10 carbon atoms in the alkyl group or the tetraalkyl titanate has 6-8 carbon atoms in the alkyl group; wherein the polymerization is carried out in the absence of a solvent, and the Ziegler-Natta catalyst is heat-treated at 120° C. or above for 2-10 hours prior to the polymerization.

* * * * *